United States Patent [19]
Schouten et al.

[11] Patent Number: 6,052,503
[45] Date of Patent: Apr. 18, 2000

[54] OPTICAL GLASS FIBER RIBBON ASSEMBLY AND RADIATION CURABLE MATRIX FORMING COMPOSITION

[75] Inventors: James J. Schouten; David M. Szum, both of Elmhurst; Chander P. Chawla, Batavia, all of Ill.

[73] Assignee: DSM N.V., Heerlen, Netherlands

[21] Appl. No.: 09/041,820

[22] Filed: Mar. 12, 1998

Related U.S. Application Data

[63] Continuation-in-part of application No. 08/709,413, Sep. 6, 1996, abandoned
[60] Provisional application No. 60/003,675, Sep. 7, 1995.

[51] Int. Cl.[7] .............................. G02B 6/44; C08F 2/46; B05D 5/06
[52] U.S. Cl. ................. 385/114; 385/100; 385/141; 385/147; 522/30; 522/35; 522/1; 427/163.1; 427/163.2
[58] Field of Search ................................. 385/100, 114, 385/115, 141, 147, 128; 522/1, 30, 35; 427/163.2, 163.1

[56] References Cited

U.S. PATENT DOCUMENTS

| | | | |
|---|---|---|---|
| Re. 33,459 | 11/1990 | Bohannan, Jr. et al. | 385/114 X |
| 4,666,244 | 5/1987 | Van der Velde et al. | 385/114 X |
| 4,844,604 | 7/1989 | Bishop | 385/115 X |
| 4,900,126 | 2/1990 | Jackson | 385/114 X |
| 4,980,007 | 12/1990 | Ferguson | 156/179 |
| 5,037,763 | 8/1991 | Petisce | 436/172 |
| 5,062,685 | 11/1991 | Cain et al. | 385/114 X |
| 5,076,881 | 12/1991 | Ferguson | 156/436 |
| 5,082,347 | 1/1992 | Akasaka et al. | 385/114 X |
| 5,259,055 | 11/1993 | Cowen et al. | 385/100 |
| 5,287,426 | 2/1994 | Shahid | 385/85 |
| 5,352,712 | 10/1994 | Shustack | 522/31 |
| 5,373,578 | 12/1994 | Parker et al. | 385/128 |
| 5,442,722 | 8/1995 | DeCarlo | 385/114 X |
| 5,457,762 | 10/1995 | Lochkovic et al. | 385/114 |
| 5,522,939 | 6/1996 | Light, Jr., et al. | 134/6 |
| 5,524,166 | 6/1996 | Osaka | 385/134 |
| 5,530,782 | 6/1996 | Osaka et al. | 385/45 |
| 5,561,730 | 10/1996 | Lochkovic et al. | 385/114 |
| 5,598,498 | 1/1997 | Comezzi | 385/114 |
| 5,600,750 | 2/1997 | Beasley, Jr. et al. | 385/114 |
| 5,604,834 | 2/1997 | Beasley, Jr. et al. | 385/114 |
| 5,812,720 | 9/1998 | Dannoux | 385/115 |
| 5,908,873 | 6/1999 | Shustack | 522/39 |
| 5,933,559 | 8/1999 | Petisce | 385/114 |
| 5,982,968 | 11/1999 | Stuplin | 385/114 |

FOREIGN PATENT DOCUMENTS

| | | | |
|---|---|---|---|
| 0 349 206 | 1/1990 | European Pat. Off. | 385/114 X |
| 0 350 900 | 1/1990 | European Pat. Off. | 385/114 X |
| 0 407 004 | 1/1991 | European Pat. Off. | 385/114 X |
| 0 660 148 | 6/1995 | European Pat. Off. | 385/114 X |

OTHER PUBLICATIONS

Accuribon Single Fiber Access, AT&T Instruction Sheet, Issue 3, Mar., 1991.
The 10th Annual National Fiber Optic Engineers Conference, vol. 2, Jun. 12–16, 1994, pp. 401–409.
Proceedings of the Thirty–Fourth IWCS, International Wire and Cable Symposium, Nov. 19–21, 1985, pp. 255–259.
Abstract, Publication No. JP63013008, Patent Abstract of Japan, Jan. 20, 1998.
Abstract, Publication No. JP3010203, Patent Abstract of Japan Jan. 17, 1991.
Bishop, Proceedings of the 41st International Wire and Cable Symposium, 1992, pp. 442–446.
Rosebrooks, N., Wire Journal International, vol. 22, No. 10, Oct., 1989, pp. 39–45.
Davis, Structures Sensing and Control, Proceedings of the Meeting, Orlando, FL., Apr. 2–3, 1991.

*Primary Examiner*—Brian Healy
*Attorney, Agent, or Firm*—Pillsbury Madison & Sutro Intellectual Property Group

[57] ABSTRACT

Provided is an optical glass fiber assembly containing a matrix material and a plurality of coated optical glass fibers bound together by said matrix material, said matrix material having a swell index and/or glass transition temperature which provides the combination of properties of: (i) a swell index of a magnitude functionally capable of facilitating mid-span access to said optical glass fibers by a solvent stripping method of said matrix material from said optical glass fibers; and/or (ii) a glass transition temperature of a magnitude to facilitate end-access to said optical glass fibers by a heat stripping method of said matrix material from said optical glass fibers at an end terminus of said optical glass fiber assembly.

36 Claims, No Drawings

OPTICAL GLASS FIBER RIBBON ASSEMBLY AND RADIATION CURABLE MATRIX FORMING COMPOSITION

This application is a continuation-in-part of Application Ser. No. 08/709,413, filed on Sep. 6, 1996, now abandoned, which itself claims priority to Provisional Application Ser. No. 60/003,675, filed on Sep. 7, 1995, the entire disclosures of which are hereby incorporated in their entirety by reference.

1. Field of the Invention

This invention relates to an optical glass fiber ribbon assembly comprising a plurality of coated optical glass fibers and a matrix material which bonds the plurality of individually coated optical glass fibers together into a ribbon format. The matrix material possesses the combination of properties to allow both mid-span access of the optical glass fibers using a solvent stripping method and/or end-access at a terminus of the optical glass fibers using a heat stripping method. This invention also relates to a radiation-curable, matrix-forming composition.

2. Description of Related Art

For the purpose of multi-channel signal transmission, ribbon assemblies containing a plurality of optical fibers have been used. Such optical glass fiber ribbon assemblies are widely used in tele-communications.

A typical ribbon assembly is made by bonding together a plurality of parallel oriented, individually coated optical glass fibers with a matrix material. The matrix material has the function of holding the individual optical glass fibers in alignment and protecting the same during handling and the installation environment. Often, the fibers are arranged in ribbon structures, having a generally flat, strand like structure containing generally from about 4 to 24 fibers. Depending upon the application, a plurality of resulting ribbon assemblies can be combined into a cable which has from several up to about one thousand individually coated optical glass fibers.

The coated optical glass fibers are usually provided with an outer colored layer in order to be able to identify the individual glass fibers. Commonly, the optical glass fibers are first individually coated with at least one coating that adheres to the glass fiber, and thereafter coated with a UV curable ink adhering to the coating. Thereafter, the required number of thus color coated optical glass fibers are bonded together in the ribbon assembly by use of a matrix material.

The coating, the ink, and the matrix material generally are UV curable compositions. An example of a ribbon assembly is described in published European patent application No. 194891. In general, a plurality of ribbon assemblies may then be combined together in a cable, as disclosed in U.S. Pat. No. 4,906,067.

It is commonly required that, in use, branching fiber connections must be made at a location intermediate to the respective termini of a given length of ribbon. Accessing the individual fibers in this manner is commonly referred to as "mid-span access" and presents special problems. Normal methods and tools for accessing the end or terminus of the ribbon assembly are generally not well adapted or are inoperable for providing mid-span access.

One common method for providing mid-span access is to contact the matrix material with a solvent, such as ethanol or isopropyl alcohol. Such a solvent must have the ability of swelling or softening the matrix material. At the same time, the solvent should be selected so as not to swell the coatings on the individual optical glass fibers. The swelling of the matrix material weakens that matrix material so that it can then be mechanically removed by mild scrubbing or similar mechanical means to remove the matrix material and thereby provide access to the individual, but still coated and color-identifiable, optical glass fibers. The matrix resin material and the solvent should be chosen together in order to be useful for this type of solvent stripping method. An example of this solvent stripping method is described in the AT&T brochure "D-182355 Accuribbon™ Single Fiber Access" (Mar. 3, 1991).

It is also commonly required that in use separate lengths of ribbon assemblies must be connected together at their ends (hereinafter "end-access"). Typically, this is achieved by fusion of respective ends of the fibers. For this purpose, it is important to secure a connection with minimum signal loss or attenuation.

A common method of for achieving end-access of the optical glass fibers at a terminus of the ribbon assembly is to use a heat stripping method. A heat stripping method typically utilizes a heat stripping tool. Such a tool consists of two plates provided with heating means. An end section of the ribbon assembly is pinched between the two heated plates and the heat of the tool softens the matrix material and softens the coatings on the individual optical glass fiber. The heat-softened matrix material and the heat-softened coatings present on the individual optical glass fibers can then be removed to provide bare optical glass fiber ends, at which the connections can be made. A knife cut is often used to initiate a break in the matrix material. Typically, only a ¼ to ½ inch section of the matrix material and coatings on the optical glass fibers need be removed so that identification of the bare individual optical glass fibers can be made by tracing back along the bare optical fiber until the colored coating is seen.

U.S. Pat. No. 5,373,578 discloses a ribbon assembly containing a plurality of coated optical glass fibers. Each of the optical glass fibers is coated with a primary coating which is adjacent to the optical glass fiber, with a secondary coating and ink coating on the primary coating. The primary coating is modified so that adhesion between the primary coating and the optical glass fiber is reduced. This reduction in adhesion facilitates easy removal of the heat-softened primary coating when using a heat stripping method. While this patent discloses, at column 5, lines 10–13, that the adhesion between the primary coating and the optical glass fiber should be sufficient to prevent delamination of the primary coating from the optical glass fiber, any reduction in the adhesion between the primary coating and the optical glass fiber increases the possibility of such undesirable delamination in the presence of moisture. Delamination of the primary coating from the optical glass fiber can lead to degradation of the optical glass fiber and attenuation of the signal transmitted through the optical glass fiber.

There is a therefore a need for a fiber assembly having a matrix material which possesses the combination of functional properties so as to permit both easy and effective mid-span access of the optical glass fibers using a solvent stripping method, and also easy and effective end-access of the optical glass fibers using a heat stripping method. Conventional fiber assemblies do not contain matrix materials which possess the combination of functional properties permitting both mid-span access of the optical glass fibers using a solvent stripping method and end-access of the optical glass fibers using a heat stripping method, as described herein.

SUMMARY OF THE INVENTION

An objective of the present invention is to provide a ribbon assembly containing a matrix material which possesses the combination of properties to allow both mid-span access to the optical glass fibers using a solvent stripping method and end-access to the optical glass fibers using a heat stripping method.

Another objective of this invention is to provide a radiation-curable, matrix-forming composition, adapted for use in forming a ribbon assembly, which when coated on a plurality of coated optical glass fibers and suitably cured possesses the combination of properties to allow both mid-span access to the optical glass fibers using a solvent stripping method and end-access to the optical glass fibers using a heat stripping method.

A further objective of this invention is to provide a radiation-curable, matrix-forming composition, exclusive of monofunctional monomers, for use in forming a ribbon assembly, which when coated on a plurality of coated optical glass fibers and suitably cured possesses properties to allow mid-span access to the optical glass fibers using a solvent stripping method.

A still further objective of this invention is to provide a radiation-curable, matrix-forming composition, exclusive of monofunctional monomers, for use in forming a ribbon assembly, which when coated on a plurality of coated optical glass fibers and suitably cured possesses a sufficient swell index for enabling the matrix material to be readily peeled from the coated fibers without substantially affecting the identifiers (e.g., colored outer coating and/or ink coating) on the coated fibers.

Another objective of this invention is to provide a radiation-curable, matrix-forming composition, comprising silicone additives, for use in forming a ribbon assembly, which when coated on a plurality of coated optical glass fibers and suitably cured provides enhanced peelability of the matrix material without substantially affecting the underlying coating and/or ink.

The above objectives and other objectives are achieved by the following.

Surprisingly, it has now been discovered that by adjusting and balancing (a) the glass transition temperature (hereinafter "Tg") and (b) the swell index of the matrix material, a matrix material for a ribbon assembly may be provided which possesses the combination of functional properties to allow both mid-span access to the optical glass fibers using a solvent stripping method and end-access to the optical glass fibers using a heat stripping method.

It has also been found that a radiation-curable matrix material, wherein the matrix-forming composition is free of monofunctional monomers (i.e., composed essentially of multifunctional monomers), possess the functional properties that allow mid-span access to the optical glass fibers using a solvent stripping method.

It has also been found that radiation-curable matrix materials resulting from matrix-forming compositions comprising silicone additives, in particular, those that also comprise silicone oligomers (preferably, those comprising a substantial portion of silicone oligomers) possess a surprisingly enhanced peelability.

The invention relates to a ribbon assembly comprising a matrix material and a plurality of coated optical glass fibers bound together by the matrix material. The matrix material possesses a combination of swell index and Tg properties which allow both mid-span access to the optical glass fibers using a solvent stripping method and end-access to the optical glass fibers using a heat stripping method.

The invention also relates to a radiation-curable, matrix-forming composition which when coated on a plurality of coated optical glass fibers and suitably cured possesses a swell index and Tg which allows both mid-span access to the optical glass fibers using a solvent stripping method and end-access to the optical glass fibers using a heat stripping method.

The matrix forming composition comprises at least one monomer or oligomer which polymerizes upon exposure to radiation.

DETAILED DESCRIPTION OF PREFERRED EMBODIMENTS

The matrix material can be composed of any conventional radiation-curable, matrix-forming coating composition which has been formulated or reformulated i) to provide a coating composition exclusive of monofunctional monomers that when cured possesses a swell index sufficient to enhance the mid-span access of the optical glass fibers by solvent stripping or peeling of the matrix material, and/or ii) to provide a coating composition that upon curing possesses a swell index and Tg that provides the combination of both mid-span access to the optical glass fibers using a solvent stripping method and end-access to the optical glass fibers using a heat stripping method. Examples of conventional radiation curable, matrix forming compositions which can now be reformulated according to this invention are disclosed in U.S. Pat. No. 4,844,604, which is incorporated herein by reference.

The radiation-curable, matrix-forming composition according to the present invention comprises as a main component at least one monomer or oligomer having at least one functional group capable of polymerization when exposed to radiation. Examples of such functional groups include epoxy groups, thiol-ene or amine-ene systems, and ethylenic unsaturation such as acrylamide, acrylate, methacrylate, vinylether, or maleate vinylether functionality. Preferably, the monomer or oligomer contain at least one acrylate or methacrylate functionality.

The radiation-curable, matrix-forming composition can also contain a diluent having at least one functional group which is capable of copolymerizing with the functionality of the monomer or oligomer. The diluent may contain the same functional group(s) described above for the oligomer or monomer. For example, the diluent can include at least one multifunctional acrylate, for instance, an acrylate monomer, such as hexanediol diacrylate or trimethylol propane triacrylate.

The monofunctional monomer free radiation-curable matrix-forming compositions preferably comprise a silicone oligomer, preferably a silicone acrylate oligomer, and more preferably a silicone polyether acrylate oligomer. Suitable monofunctional monomer free matrix material compositions are those comprising at least 20 wt. %, preferably 50 wt. %, more preferably 60 wt. %, and most preferably 70 to 95 wt. %, relative to total composition.

Matrix material composition that include between 0.5 to 5.0 wt. %, relative to the total composition, of at least one silicone additive, for instance, alkylene oxide containing siloxanes such as: di-methyl, methyl(polyethylene oxide acetate-capped) siloxane, polyethylene glycol diacetate, polyethylene glycol allyletheracetate; di-methyl, methyl (propyl-polyethylene oxide polypropylene oxide, acetate) siloxane or the like, are particularly preferred. More preferred matrix-forming compositions include those that comprise at least one of these silicone additives and at least one silicone oligomer. Particularly preferred matrix-forming compositions are those which are monofunctional monomer free and comprise at least one silicone oligomer, in the amount noted above, and at least one silicone additive, more preferably at least two silicone additives.

The matrix forming composition can also further comprise a photoinitiator, stabilizer, or an antiblocking agent for their known function.

The swell index of the cured matrix material can be easily determined by measuring the initial volume of the matrix material, immersing the matrix material in a solvent, and then measuring the volume of the matrix material after immersion. The swell index is the percent change in volume of the matrix material.

The swell index of the matrix material will depend on the particular solvent selected. Any solvent can be used which (1) causes the matrix material to swell, and (2) which does not unacceptably and deleteriously affect the coatings on the optical glass fibers. Based on the disclosure provided herein, one skilled in the art will easily be able to determine which solvents are suitable for swelling the matrix material. Examples of suitable solvents have been found to be ethanol and/or isopropyl alcohol.

It is desirable that the matrix material swell in the solvent within a short period of time, such as within about 10 minutes or less, preferably within about 7 minutes or less. Preferably, the cured matrix material is immersed in the solvent at ambient working temperatures. However, if desired, the solvent can be heated to increase the speed of the swelling of the matrix material.

If the swell index of the matrix material is insufficient, one skilled in the art will easily be able to reformulate the matrix-forming composition to increase the swell index of the matrix material. For example, the matrix-forming composition can be reformulated to reduce the cross-link density. This can be accomplished by reducing the amount of crosslinking agent, such as SR368 (Sartomer) which was used in the Examples below. Another suitable way of increasing the swell index would be to increase the amount of radiation-curable oligomer used in the matrix forming composition, such as Ebecryl 4842.

The swell index should be sufficient for the matrix material to be easily separated from the optical glass fibers by rubbing with an abrasive surface or peeling the swelled matrix material. An example of a suitable swell index has been found to be greater than 7%, preferably at least about 10%, and more preferably at least about 15% by volume. In addition to these swell index values, preferred monomer free matrix-forming compositions, in particular those comprising silicone oligomers and optionally silicone additives, may possess swell indexes of at least 25% by volume, or more preferably 30% by volume.

At the same time, for end-access using the heat stripping method, the Tg of the cured matrix material should be high enough to maintain sufficient structural integrity of the matrix material as it is being separated from the optical glass fibers. If the Tg is not sufficiently high to retain the structural integrity of the matrix material, the matrix material will disadvantageously break apart when it is being separated from the optical glass fibers.

The Tg of the cured matrix material should also be high enough such that when force is applied to the matrix material to separate the heat-softened matrix material from the optical glass fibers sufficient force is transmitted through the matrix material, and any intervening coatings present on the optical glass fibers, to the primary coating on the optical glass fibers to thereby separate the heat-softened primary coating from the optical glass fibers. In this manner, when the cured matrix material according to the invention is separated from the glass optical fibers, the matrix material and primary coatings can be efficiently and rapidly separated from the optical glass fibers, so as to provide bare optical glass fibers to which connections can be made.

The present invention avoids the problems associated with the conventional method of reducing the adhesion between the primary coating and the optical glass fiber to provide heat strippability. When the adhesion between the primary coating and the optical glass fiber is reduced to provide strippability, the primary coating can delaminate from the optical glass fiber in the presence of moisture, which can cause attenuation of the signal transmitted through the optical glass fiber. In the present invention, the adhesion between the primary coating and the glass optical fiber need not be reduced to provide heat strippability.

The temperature of the heat stripping tool required will depend on the Tg of the matrix material. The higher the Tg of the matrix temperature, the higher the temperature that can be applied to matrix material while retaining structural integrity of the matrix material. A typical temperature used to heat strip the matrix material is about 90° C.

One skilled in the art will recognize how to vary the components present in the matrix forming composition to provide a cured matrix material having the desired Tg. For example, such a person will know that the hydrodynamic volume of the oligomers or monomers present in the matrix forming composition can be increased which will generally increase the Tg of the cured matrix material. Furthermore, such a person will know that the cross-linking density in the cured matrix can be increased which will generally increase the Tg.

It has been found that a suitable Tg of the cured matrix material, to possess the property of end-access to the optical glass fibers using heat strippability, is typically above 30° C., in particular at least 60°, preferably at least about 80° C., and most preferably at least about 95° C. The Tg of a matrix material can be measured by a Dynamic Mechanical Analysis, using the temperature of the Tangent Delta Maximum as a convenient marker to identify this temperature.

The novel optical glass fiber ribbon assemblies made according to this invention can be used in telecommunication systems. Such telecommunication systems typically include optical glass fiber ribbon assemblies containing optical glass fibers, transmitters, receivers, and switches. The assemblies containing the optical glass fiber are the fundamental connecting units of telecommunication systems. The assemblies can be buried under ground or water for long distance connections, such as between cities.

The present invention will be further described by the following non-limiting examples.

EXAMPLES

The invention will be further explained by the following non-limiting examples (E1–E8) and comparative examples (C1–C4). Radiation curable matrix forming compositions were made by combining the ingredients shown in the following Table 1. These compositions were then coated onto polyester films and cured using a 1 Joule, fusion D-lamp, in a nitrogen atmosphere.

The swell index and the Tg of the cured matrix materials were then measured and the results are shown in Table 1.

TABLE 1

| Reactant | C1 | C2 | C3 | C4 | E1 | E2 | E3 | E4 | E5 | E6 | E7 | E8 |
|---|---|---|---|---|---|---|---|---|---|---|---|---|
| Urethane Acrylate 1003H | — | — | — | 50 | — | — | — | — | — | — | — | — |
| Urethane Acrylate 1004H | 49.35 | 36.22 | 16.1 | — | — | 32.2 | 16.10 | 24.68 | 16.1 | — | — | — |
| Urethane Acrylate 1003-9 | — | — | — | — | — | — | — | — | — | 16.1 | 16.1 | — |
| Ebecryl 4842 | 0 | 12.08 | 16.1 | 0 | 49.35 | 32.2 | 40.25 | 24.68 | 40.25 | 40.25 | 40.25 | 74.5 |
| Lucerin TPO | — | — | — | 1.5 | — | — | — | — | — | — | 3.0 | — |
| Sartomer SR368 | 31.15 | 32.20 | 48.3 | 31.5 | 31.15 | 16.1 | 24.15 | 31.15 | 24.15 | 24.15 | 24.15 | — |
| Sartomer SR351 | — | — | — | — | — | — | — | — | — | — | — | 22.0 |
| Sartomer SR238 | 5 | 5 | 5 | 5 | 5 | 5 | 5 | 5 | 5 | 5 | 5 | — |
| Sartomer SR506 | 10 | 10 | 10 | — | 10 | 10 | 10 | 10 | — | — | — | — |
| IBOA | — | — | — | 10 | — | — | — | — | — | — | — | — |
| Tinuvin 292 | — | — | — | 0.5 | — | — | — | — | — | — | — | — |
| Vinylcaprolactam | — | — | — | — | — | — | — | — | 10 | 10 | 10 | — |
| Irgacure 184 | 3 | 3 | 3 | — | 3 | 3 | 3 | — | 3 | 3 | — | 2.0 |
| Irganox 1010 | — | — | — | 0.5 | — | — | — | — | — | — | — | — |
| Irganox 1035 | — | — | — | — | — | — | — | — | — | 0.5 | 0.5 | — |
| Irganox 245 | 0.5 | 0.5 | 0.5 | — | 0.5 | 0.5 | 0.5 | — | 0.5 | — | — | 0.5 |
| DC-190 | 0.64 | 0.64 | 0.64 | 0.64 | 0.64 | 0.64 | 0.64 | — | 0.64 | 0.64 | 0.64 | 0.67 |
| DC-57 | 0.36 | 0.36 | 0.36 | 0.36 | 0.36 | 0.36 | 0.36 | 0.36 | 0.36 | 0.36 | 0.36 | 0.36 |
| Results | | | | | | | | | | | | |
| Swell Index (Volume %) | 4.9 | 4.9 | 4.9 | 7 | 25.2 | 36.4 | 25.2 | 14.7 | 19.9 | 19.9 | 19.9 | 31 |
| Glass Transition Temperature (° C.) | 100.6 | — | 150.5 | 106 | 112.5 | 62 | 95.5 | 100 | 113 | 108 | 103 | 33 |

Reactants

Urethane acrylate 1003H: polyether based, aliphatic urethane acrylate oligomer having a number average molecular weight in the range of 1200–1400 and an average of 2 acrylate functional groups.

Urethane acrylate 1004H: polyether based, aromatic urethane acrylate oligomer having a number average molecular weight in the range of 1300–1600 and an average of 2 acrylate functional groups.

Urethane acrylate 1003-9: polyether based, aliphatic urethane acrylate oligomer having a number average molecular weight in the range of 1300–1500 and an average of 2 acrylate functional groups.

Ebecryl 4842: silicone acrylate oligomer (Radcure Inc.).

Lucerin TPO: Diphenyl(2,4,6-trimethylbenzoyl) phosphine oxide and 2-hydroxy-1-methyl-1-phenyl-1-propanone (BASF).

SR238: 1,5-hexadiol diacrylate (Sartomer).

SR351: Trimthylolpropane triacrylate (Sartomer).

SR368: Tris(2-hydroxy ethyl isocyanurate triacrylate) (Sartomer).

SR506: Isobornyl acrylate (Sartomer).

Tinuvin 292: Bis(1,2,2,6,6-pentamethyl-4-piperidinyl sebacate) (Ciba Geigy).

IBOA: Isobornyl acrylate (Radcure Inc.).

DC-57: di-methyl, methyl(polyethyleneoxide acetate-capped) siloxane, polyethylene glycol diacetate, polyethylene glycol allyletheracetate (TAB).

DC-190: di-methyl, methyl(propylpolyethylene oxide polypropylene oxide, acetate) siloxane (TAB).

Irgacure 184: 1-hydroxycyclohexylphenyl ketone (Ciba Geigy).

Irganox 1010: tetrakis(methylene(3,5-di-tert-butyl-4-hydroxyhydrocinnamate))methane (Ciba Geigy).

Irganox 245: triethylene glycol bis (3-(3'-tert-butyl-4'-hydroxy-5'-methylphenyl(propionate))) (Ciba Geigy).

The matrix material examples (E1–E7) all exhibited, in accordance with the invention, the combination of a high Tg and a high swell index. Similarly, the matrix material example (E8) exhibited high swell index while being exclusive of monofunctional monomers. This result is unexpected considering a reduction or virtual elimination of monofunctional monomers typically results in an increased crosslinking density and decreased swell index. Thus, ribbon assemblies containing the matrix materials in these examples will provide mid-span access of the individual optical glass fiber using the heat stripping method or end-access of the individual optical glass fibers using the solvent stripping method. Current ribbon assemblies, which are represented by comparative examples C1–C4, do not have matrix materials which possess the combination of properties to allow both mid-span access of the optical glass fibers using the solvent stripping method and/or end-access of the optical glass fibers using the heat stripping method.

Test Procedures

Swell Index

The swell index was measured by immersing the cured matrix materials in a 95% ethanol, 5% isopropyl alcohol solution for about 7 minutes at ambient room temperature. The swell index reported in Table 1 is the percent change in the volume of the matrix material after immersion in the solution.

Tg

The elastic modulus (E'), the viscous modulus (E"), and the tan delta (E"/E') of the examples were measured using a Rheometrics Solids Analyzer (RSA-11), equipped with: 1) A personal computer having MS-DOS 5.0 operating system and having Rhios® software (Version 4.2.2 or later) loaded; 2) A liquid nitrogen controller system for low-temperature operation. The maximum value of the tan delta measured is the Tg.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness cannot vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −80° C. and increasing the temperature at about 1°/minute until the temperature reached a point at which the equilibrium modulus has been reached. The test frequency used was 1.0 radian/second.

While the invention has been described in detail and with reference to specific embodiments thereof, it will be apparent to one of ordinary skill in the art that various changes and modifications can be made therein without departing from the spirit and scope of the claimed invention.

What is claimed is:

1. An optical glass fiber assembly comprising:
   a plurality of coated optical glass fibers; and
   a matrix material binding together said plurality of coated optical glass fibers, said matrix material having the combination of properties of:
   (i) a swell index of a magnitude functionally capable of facilitating mid-span access to said optical glass fibers by a solvent stripping method of said matrix material from said optical glass fibers; and
   (ii) a glass transition temperature of a magnitude to facilitate end-access to said optical glass fibers by a heat stripping method of said matrix material from said optical glass fibers at an end terminus of said optical glass fiber assembly.

2. An optical glass fiber assembly comprising:
   a plurality of coated optical glass fibers; and
   a matrix material binding together said plurality of coated optical glass fibers, said matrix material having the combination of properties of:
   (i) a swell index greater than 7% by volume which facilitates mid-span access to said optical glass fibers by a solvent stripping method of said matrix material from said optical glass fibers; and
   (ii) a glass transition temperature of at least about 60° C. to facilitate end-access to said optical glass fibers by a heat stripping method of said matrix material from said optical glass fibers at an end terminus of said optical glass fiber assembly.

3. An optical glass fiber assembly according to claim 2, wherein said matrix material has a swell index of at least about 10% by volume.

4. An optical glass fiber assembly according to claim 2, wherein said matrix material has a swell index of at least about 15% by volume.

5. An optical glass fiber assembly according to claim 2, wherein said matrix material has a swell index of at least about 10% by volume measured in a solution comprising ethyl alcohol or isopropyl alcohol under ambient working conditions.

6. An optical glass fiber assembly according to claim 2, wherein said matrix material has a swell index of at least about 15% by volume measured in a solution comprising ethyl alcohol or isopropyl alcohol under ambient working conditions.

7. An optical glass fiber assembly according to claim 2, wherein said matrix material has a glass transition temperature of at least about 80° C.

8. An optical glass fiber assembly according to claim 2, wherein said matrix material has a glass transition temperature of at least about 95° C.

9. A radiation curable, matrix forming composition which when coated and suitably cured on a plurality of coated optical glass fibers has the combination of properties of:
   (i) a swell index of a magnitude functionally capable of facilitating mid-span access to said optical glass fibers by a solvent stripping method of said matrix material from said optical glass fibers; and
   (ii) a glass transition temperature of a magnitude to facilitate end-access to said optical glass fibers by a heat stripping method of said matrix material from said optical glass fibers at an end terminus of said optical glass fiber assembly,
   said matrix forming composition comprising at least one monomer or oligomer which polymerizes upon exposure to radiation.

10. A radiation curable, matrix forming composition according to claim 9, wherein said monomer or oligomer contains at least one acrylate or methacrylate functional group.

11. A radiation curable, matrix forming composition which when coated and suitably cured on a plurality of coated optical glass fibers provides the combination of properties of:
    (i) a swell index greater than 7% by volume which facilitates mid-span access to said optical glass fibers by a solvent stripping method of said matrix material from said optical glass fibers; and
    (ii) a glass transition temperature of at least about 60° C. to facilitate end-access to said optical glass fibers by a heat stripping method of said matrix material from said optical glass fibers at an end terminus of said optical glass fiber assembly,
    said matrix forming composition comprising at least one monomer or oligomer which polymerizes upon exposure to radiation.

12. A radiation curable, matrix forming composition according to claim 11, wherein said monomer or oligomer contains at least one acrylate or methacrylate functional group.

13. A radiation curable, matrix forming composition according to claim 11, wherein said matrix forming composition is adapted to provide matrix material having a swell index of at least about 10% by volume.

14. A radiation curable, matrix forming composition according to claim 11, wherein said matrix forming composition is adapted to provide a matrix material having a swell index of at least about 15% by volume.

15. A radiation curable, matrix forming composition according to claim 11, wherein said matrix forming composition is adapted to provide matrix material having a swell index of at least about 10% by volume measured in a solution comprising ethyl alcohol or isopropyl alcohol under ambient working conditions.

16. A radiation curable, matrix forming composition according to claim 11, wherein said matrix forming composition is adapted to provide a matrix material having a swell index of at least about 15% by volume measured in a solution comprising ethyl alcohol or isopropyl alcohol under ambient working conditions.

17. An radiation curable, matrix forming composition according to claim 11, wherein said matrix forming composition is adapted to provide a matrix material having a glass transition temperature of at least about 80° C.

18. An radiation-curable, matrix forming composition according to claim 11, wherein said matrix forming compositions is adapted to provide a matrix material having a glass transition temperature of at least about 95° C.

19. A telecommunications system comprising:
   an optical glass fiber assembly containing:
      a matrix material; and
      a plurality of coated optical glass fibers bound together by said matrix material, said matrix material having a swell index and glass transition temperature which provides the combination of properties of:
         (i) a swell index of a magnitude functionally capable of facilitating mid-span access to said optical glass fibers by a solvent stripping method of said matrix material from said optical glass fibers; and
         (ii) a glass transition temperature of a magnitude to facilitate end-access to said optical glass fibers by a heat stripping method of said matrix material from said optical glass fibers at an end terminus of said optical glass fiber assembly.

20. A telecommunications system comprising:
   an optical glass fiber assembly containing:
      a matrix material; and
      a plurality of coated optical glass fibers bound together by said matrix material, said matrix material having a swell index greater than 7% by volume and glass transition temperature of at least about 60° C. which provides the combination of properties of:
         (i) a swell index greater than 7% by volume which facilitates mid-span access to said optical glass fibers by a solvent stripping method of said matrix material from said optical glass fibers; and
         (ii) a glass transition temperature of at least about 60° C. to facilitate end-access to said optical glass fibers by a heat stripping method of said matrix material from said optical glass fibers at an end terminus of said optical glass fiber assembly.

21. An optical glass fiber assembly comprising:
   a plurality of coated optical glass fibers; and
   a matrix material, formed from a monofunctional monomer free matrix-forming composition, binding together said plurality of coated optical glass fibers, said matrix material having a swell index of a magnitude functionally capable of facilitating mid-span access to said optical glass fibers by a solvent stripping method of said matrix material from said optical glass fibers.

22. The optical glass fiber assembly of claim 21, wherein the swell index of said matrix material is greater than about 7% by volume.

23. The optical glass fiber assembly according to claim 22, wherein the swell index is at least about 15% by volume.

24. The optical glass fiber assembly according to claim 22, wherein said matrix material has a swell index of at least about 10% by volume measured in a solution comprising ethyl alcohol or isopropyl alcohol under ambient working conditions.

25. A monofunctional monomer free radiation-curable, matrix-forming composition which when coated and suitably cured on a plurality of coated optical glass fibers has a swell index of a magnitude functionally capable of facilitating mid-span access to said optical glass fibers by a solvent stripping method of said matrix material from said optical glass fibers.

26. The radiation-curable, matrix-forming composition of claim 25, wherein said swell index is greater than 7% by volume.

27. The radiation-curable, matrix-forming composition according to claim 25, wherein said monomers introduced into said composition contain at least two acrylate or methacrylate functional groups.

28. A telecommunications system comprising:
   an optical glass fiber assembly containing:
      a matrix material formed from a monofunctional monomer free composition; and
      a plurality of coated optical glass fibers bound together by said matrix material, said matrix material having a swell index of a magnitude functionally capable of facilitating mid-span access to said optical glass fibers by a solvent stripping method of said matrix material from said optical glass fibers.

29. A radiation-curable, matrix-forming composition comprising, the following premixture components:
   a silicone oligomer comprising at least one radiation-curable functional group,
   wherein said composition is exclusive of any monofunctional monomer components and when suitably cured has a swell index of at least 7% by volume.

30. The composition of claim 29 wherein said silicone oligomer component includes a silicone polyether oligomer.

31. The composition of claim 30 wherein said silicone polyether oligomer comprises an acrylate or methacrylate radiation-curable functional group.

32. The composition of claim 29, wherein said composition further comprises at least one silicone additive.

33. The composition of claim 32, wherein said at least one additive includes an alkylene oxide silicone additive.

34. The composition of claim 29, wherein said composition when suitably cured has a swell index of at least 25% by volume.

35. The composition of claim 29, wherein said composition when suitably cured has a swell index of at least 31% by volume.

36. The composition of claim 35, wherein said composition further comprises at least one silicone additive.

* * * * *